No. 728,728. PATENTED MAY 19, 1903.
S. KIRLIN.
LINEMAN'S IMPLEMENT.
APPLICATION FILED OCT. 30, 1902.
NO MODEL.
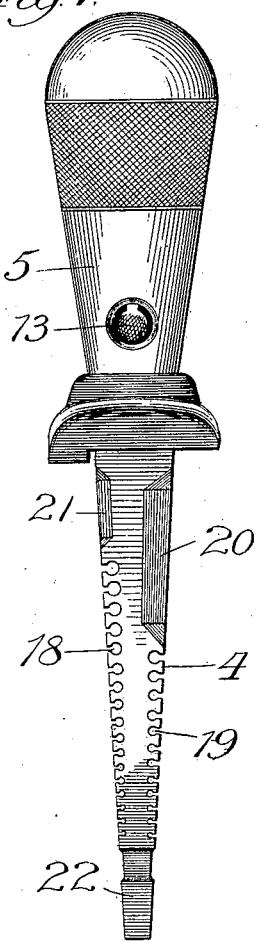
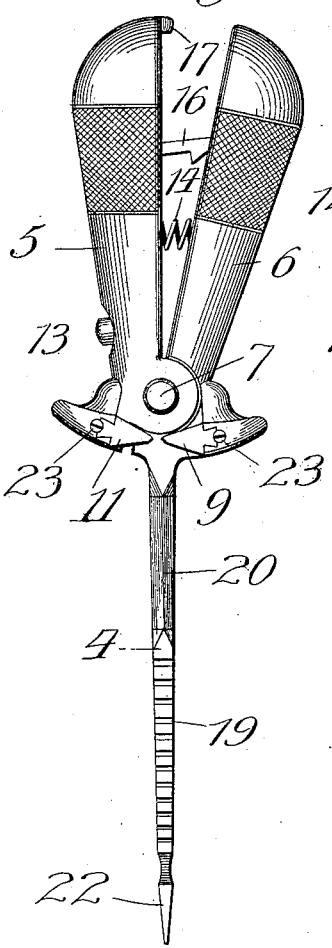
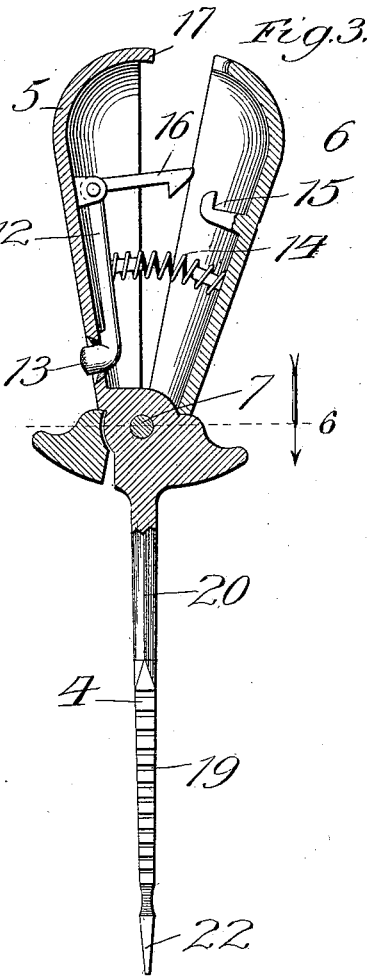
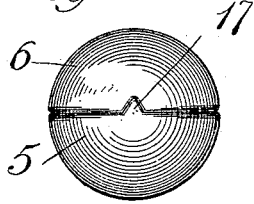
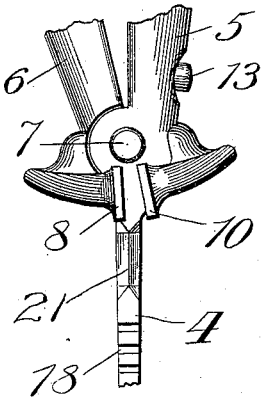
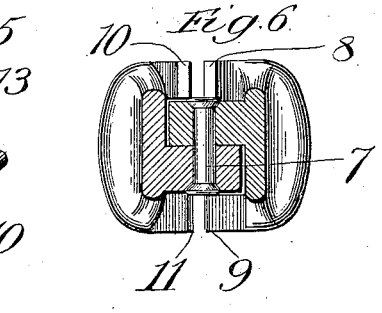
Witnesses:
Gaylord,
John Enders Jr.
Inventor,
Samuel Kirlin,
By Foré Rain
Att'y No. 728,728. Patented May 19, 1903.

UNITED STATES PATENT OFFICE.

SAMUEL KIRLIN, OF WATERTOWN, SOUTH DAKOTA.

LINEMAN'S IMPLEMENT.

SPECIFICATION forming part of Letters Patent No. 728,728, dated May 19, 1903.

Application filed October 30, 1902. Serial No. 129,359. (No model.)

*To all whom it may concern:*

Be it known that I, SAMUEL KIRLIN, of Watertown, in the county of Codington and State of South Dakota, have invented certain new and useful Improvements in Linemen's Implements; and I hereby declare that the following is a full, clear, and exact description thereof, reference being had to the accompanying drawings, which form part of this specification.

My invention relates to improvements in linemen's implements adapted to be conveniently used by linemen and electric workers.

The object of my invention is to provide an implement comprising a series of tools conveniently grouped so that they may be independently used.

The invention consists of a combination tool or implement consisting of a shank terminating in a screw-driver having on either or both edges wire gages of the standard systems, a scraper, a cutting-blade, wire nippers or cutters, and pliers.

In the drawings, Figure 1 is an elevation of the device. Fig. 2 is a side elevation of the same. Fig. 3 is a central vertical section through Fig. 1. Fig. 4 is an end view of the instrument. Fig. 5 is a broken-away side elevation showing the pliers. Fig. 6 is a transverse section taken on line 6 6 of Fig. 3.

In all of the views the same numerals indicate similar parts.

The shank of the combination-tool is indicated by 4. This is preferably to be made of a good quality of steel, made integral with or subsequently electrically welded or otherwise attached to the piece 5 of the two-part handle. The part 6 of the handle is hinged to the parts just described by means of the pin 7 passing through both parts. The jaws 8 of the pliers and the cutting-jaw 9 of the nippers are each carried by the shank 4 and handle 5. Jaws 10 and 11, adapted to coact with the jaws 8 and 9, respectively, are carried by the movable handle part 6. When the hinged handle comprising the parts 5 and 6 is closed the cutting-jaws and gripping-jaws are thereby brought into close respective contact or proximity for the purposes for which they are designed. A bell-crank latch 12 is placed within the handle and provided upon its downwardly-extended end with a push-button terminal 13, which projects through the wall of the handle part to which said lever is attached and is adapted to be depressed by the finger of the operator for the purpose of separating the parts of the handle prior to using the nippers or the pliers. A spring 14, bearing at one end on the latch and at its other end against the opposite handle-section, is adapted to hold the parts of the handle normally open and the latch-lever 12 in an engaging position. A detent 15 is fixed to or forms an integral part of the handle part 6 and is adapted to become engaged with the latch of the lever 12, and thereby hold the parts 5 and 6 in closed position. (Shown in Figs. 1 and 4.) Pressure on the button 13, overcoming the tension of spring 14 releases the latch 16 from the detent 15 and permits the parts to occupy the positions shown in Figs. 2, 3, 5, and 6, into which they are forced by the action of the spring 14. A rather firm pressure of the hand upon the handle brings the parts 5 and 6 together, thereby closing the plier and nipper jaws. When the instrument is closed, a projection 17, fixed to one of the handle parts, enters a corresponding depression in the other handle part, thus holding the parts against lateral displacement when a twisting effort is applied to the handle when using the screw-driver, affording great strength.

A graduated wire-gage 18 is made into the one edge of the shank 4. This may be graduated according to the Brown & Sharpe or American gage, and another gage 19 may be made into the opposite edge of the shank, which may be of the Birmingham wire-gage standard. Copper wires are usually drawn to the former and iron wires to the latter gage. Both gages are not absolutely essential, as either gage alone may be used.

20 is a knife-cutting edge made into one side of the shank 4, or the cutting edge 20 may be extended to the screw-driver part of the shank in lieu of the gage 19, if desired.

21 is a scraping edge adapted to be used for scraping the surfaces of the wires prior to making joints and for other purposes, such as removing light insulation from wires.

22 is a screw-driver terminal of the shank 4.

23 23 are screws adapted to hold the removable cutting-jaws 9 and 11 of the nippers in place.

The use and operation of my device are obvious to those persons who are skilled in the art. Its convenience is its greatest merit, combining in one instrument all of the small tools that are usually required by electric workers in a compact, durable, and convenient structure.

Having described my invention, what I claim as new, and desire to secure by Letters Patent of the United States, is—

1. In a combination implement, a single-piece tool adapted to be rotated upon its longitudinal axis, a jaw rigidly associated with said tool, a handle part carrying said jaw, a coacting jaw, a handle part carrying said coacting jaw pivoted to the first said handle part, and releasable means for securing said handle parts together, the handle parts being arranged to jointly form, when secured together, a unitary handle for the single-piece tool axially alining therewith and disposed symmetrically about said axis, and, when released, to form relatively movable operating means for the jaws.

2. In a combined implement, a hollow handle, symmetrically formed about its axis, and longitudinally divided into two parts, said parts being intercrossed and pivoted at a point near the end thereof, and provided with coacting jaws arranged beyond said pivot-point, a tool adapted for axial rotation secured to one of said handle parts beyond the jaws and disposed in axial alinement with the handle, interengaging latch members arranged within the hollow handle and secured to the respective parts thereof, and a latch-releasing means extending through a perforation in said handle to the exterior thereof at a point adjacent to the pivot.

3. In an implement of the character described, a two-part hollow handle, having its parts pivotally connected, a single-piece implement carried by one of the parts, coacting jaws carried by the opposing handle parts, a bell-crank latch pivotally mounted within the handle upon one part, having one end adapted for engagement with the opposing part and its other end extending through the handle to the exterior thereof to form a push-button, and a means for normally holding the latch in operative position.

4. In an implement of the character described, a two-part hollow handle having its parts pivotally connected, a single-piece implement carried by one of said parts, coacting jaws carried by the opposing handle parts, a detent carried interiorly by one handle part, a bell-crank latch carried by the other and arranged for engagement with said detent, said latch having an arm extending to the exterior of the handle, and a spring interposed between said arm and the handle part carrying the detent.

5. In an implement of the character described, a two-part hollow handle having its parts pivotally connected, a latch carried by one handle part and engaging the other to lock the parts together, a spring disposed to normally tend to separate the handle parts and to restore the latch to position for engagement with the opposing part after its release therefrom, and means for releasing the latch.

6. In a combination implement, a hollow handle comprising two parts pivotally connected near one end, a single-piece implement rigidly secured to one of said parts, jaws adapted to coact carried by the opposing handle parts, automatic latch devices within the hollow handle for securing the handle parts in fixed position when brought together, and means extending to the exterior of the handle for releasing said latch.

In testimony that I claim the foregoing as my own I affix my signature in presence of two witnesses.

SAMUEL KIRLIN.

In presence of—
EDWIN J. EATON,
JOHN I. MYLES.